United States Patent [19]

Bawden

[11] 4,306,664

[45] Dec. 22, 1981

[54] TANK

[75] Inventor: Ralph D. Bawden, Billings, Mont.

[73] Assignee: Recreational Plastics, Inc., Wibaux, Mont.

[21] Appl. No.: 101,866

[22] Filed: Dec. 10, 1979

[51] Int. Cl.³ .......................... B65D 1/42; B65D 21/02
[52] U.S. Cl. ..................................... 220/72; 206/518; 206/519; 220/1 B
[58] Field of Search ...................... 220/1 B, 5 A, 72; 206/507, 515, 518, 519, 520

[56] References Cited

U.S. PATENT DOCUMENTS

| 2,064,518 | 12/1936 | Brogden | 206/507 |
| 2,655,283 | 10/1953 | Moldt | 220/72 |
| 3,311,257 | 3/1967 | Puente | 220/72 |
| 3,358,616 | 12/1967 | Brodhead | 220/5 A |
| 3,773,213 | 12/1973 | Frederick | 206/507 |
| 4,214,670 | 7/1980 | Berger | 220/1 B |

FOREIGN PATENT DOCUMENTS 318828 12/1969 Sweden ................. 220/72

Primary Examiner—George E. Lowrance

Attorney, Agent, or Firm—Arthur L. Urban

[57] ABSTRACT

A tank including a bottom portion, sidewall portions and endwall portions forming a unitary structure with a top opening, a plurality of support sections spaced about the periphery of the structure, the support sections including buttress sections extending from the bottom portion upwardly toward and terminating adjacent the free edges of the wall portions, each of the buttress sections including a main surface that is spaced from the wall portion adjacent the bottom portion and converges toward the wall portion adjacent the free edge thereof, the support sections including base sections extending upwardly from the bottom portion a fraction of the height of the wall portion, each of the base sections including a main surface disposed substantially parallel to and spaced from the wall portion, each of the base sections including a top surface substantially parallel to the bottom portion, the base sections being disposed between the buttress sections, the base sections being disposed along one wall portion in positions staggered from the positions of buttress and base sections disposed along an opposite wall portion.

11 Claims, 5 Drawing Figures

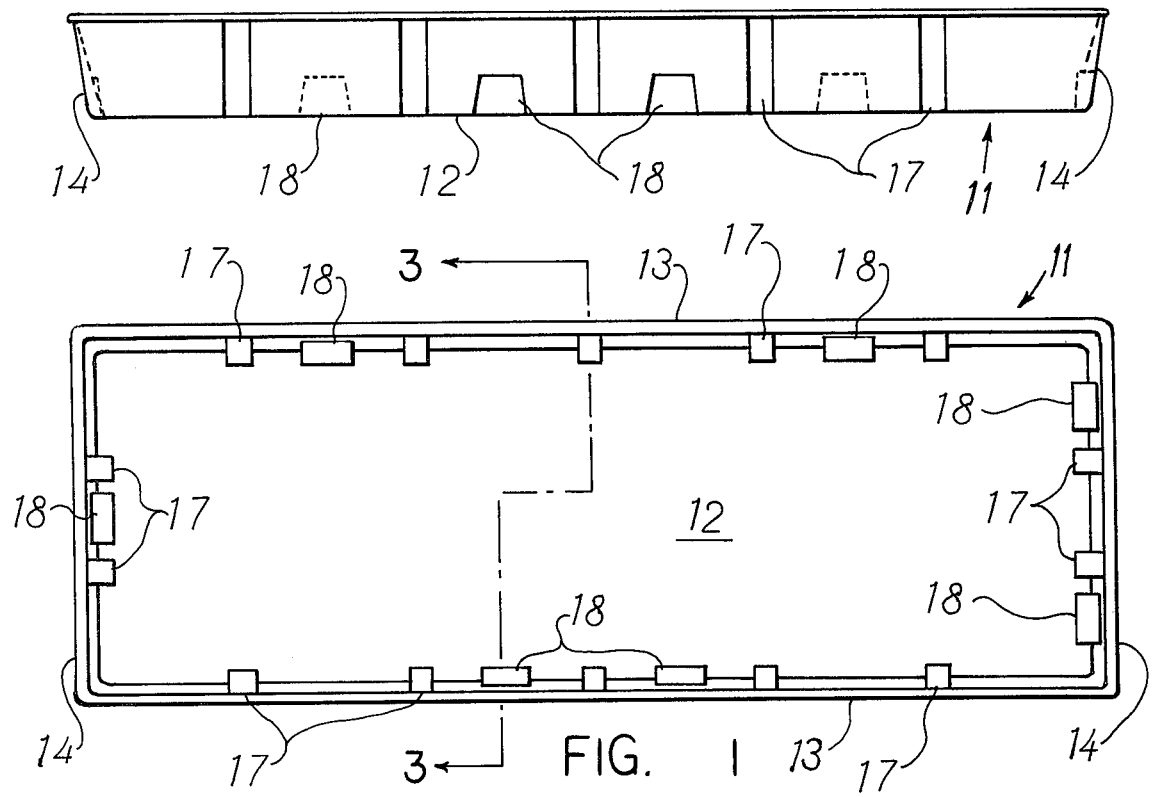
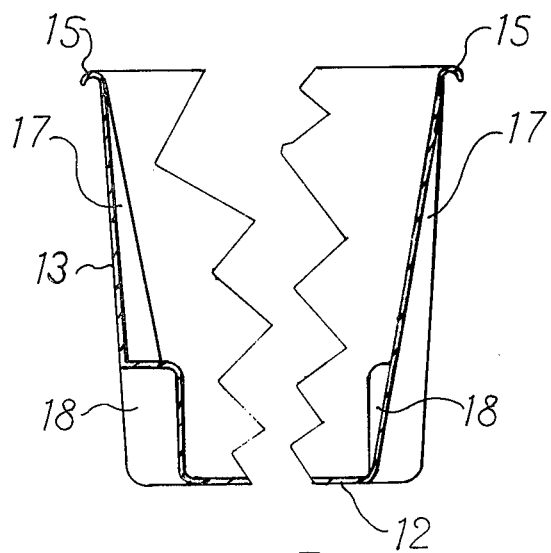
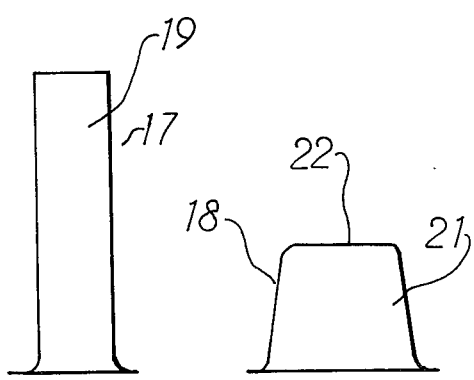

TANK

This invention relates to a noval tank and more particularly relates to a new storage tank.

Storage tanks for liquids are made in a variety of shapes. The shape selected ordinarily is dependent upon the desires or needs of the user. One essential of tanks is that the walls have sufficient structural integrity that they will support the weight of the liquid within the tank.

The problems of tank design are compounded with increases in the size thereof. As tank size increases, the walls of the tank must be greatly strengthened to maintain the structural integrity of the tank and to confine the contents properly.

Strengthening the walls necessitates changes in the materials of which the walls are fabricated or employing materials of greater weight and thickness. Strengthening of the walls is particularly important with tanks which simply rest on the ground since in such cases the walls have no outside support whatsoever.

One important use of liquid storage tanks is in stock watering tanks. Ranchers and other stockmen place tanks at a number of locations on their property to provide water for their stock. Since the stock ordinarily is moved from one area of the property to another as the grass is eaten, it is necessary to provide water at each of the areas in which the stock will be grazing.

Stock watering tanks generally are galvanized metal tanks that are round or oval in shape. Although galvanized metal tanks are widely used, they do have a number of drawbacks. Their weight is great, particularly with tanks of any significant size. This makes them difficult for ranchhands to handle when the tanks must be moved.

Another shortcoming of galvanized tanks is that they cannot be stacked. Thus, only a limited number of tanks can be transported. This increases delivery costs of the manufacturer and their dealers. In addition, large capacity tanks generally have dimensions larger than the width of the trucks so that special permits are required to haul them on highways. Also, the customer's time and costs in placing and subsequently relocating the tanks on his property are greater.

A further drawback of galvanized metal tanks is their high cost. Because of high cost, a rancher may be inclined to minimize the number of tanks he purchases which will require that the tanks be moved more times during the year. Also, the galvanized metal eventually will rust and the tanks will have to be replaced when they begin leaking. In addition, the galvanized bottom surface is very slippery so that it is difficult for stock to get out of the tank if they should accidentally step into it.

The present invention provides a novel tank with features not previously available. The tank of the invention is of a configuration which facilitates its transfer by truck simply and conveniently. Also, the tank of the invention is relatively light in weight so that it can be handled easily.

The tank of the invention can be stacked so that the number of tanks that can be carried on a truck is significantly increased. In addition, the container allows stock to get out easily if they should accidentally step into it.

The novel tank of the invention is simple in design. It can be fabricated in very large sizes. The tank is strong and can accommodate large quantities of liquid. The tank of the invention has good durability and is impervious to corrosion. The tank is relatively inexpensive to manufacture. The tank can be fabricated from commercially available materials employing conventional tank fabricating techniques and semi-skilled labor.

Other benefits and advantages of the novel tank of the present invention will be apparent from the following description and the accompanying drawings in which:

FIG. 1 is a top view of one form of the tank of the invention;

FIG. 2 is a side view of the tank shown in FIG. 1;

FIG. 3 is an enlarged broken sectional view taken along line 3—3 of FIG. 1;

FIG. 4 is an enlarged front view of a buttress section of the tank shown in FIG. 1; and FIG. 5 is an enlarged front view of a support section of the tank shown in FIG. 1.

As shown in the drawings, one form of the novel tank 11 of the present invention includes a bottom portion 12, sidewall portions 13 and endwall portions 14. The bottom portion 12, the sidewall portions 13 and the endwall portions 14 form a unitary structure with a top opening. Advantageously, the tank 11 includes a peripheral rim portion 15 around the free edges of the sidewall portions. The tank 11 preferably has a generally rectangular opening.

A plurality of support sections are spaced about the periphery of the tank 11. The support sections include buttress sections 17 and base sections 18. The buttress sections 17 extend upwardly from bottom portion 12 along the wall portions 13 and 14. The buttress sections 17 terminate adjacent the free edges of the wall portions. The buttress sections 17 include a main surface 19 that is spaced from the wall portions 13 and 14 adjacent the bottom portion 12 and converges toward the wall portions adjacent the free edges thereof. Advantageously, the main surfaces 19 of the buttress sections have a generally rectangular shape as shown in FIG. 4 and preferably have a height greater than twice their width. It is desirable that the main surfaces of the buttress sections be spaced from the wall portions 13 and 14 at a point adjacent the bottom portion 12 a distance less than the width of the main surfaces.

The base sections 18 of the support sections extend upwardly from the bottom portion 12 a fraction of the height of the wall portions. Each of the base sections 18 includes a main surface 21 disposed substantially parallel to and spaced from the wall portions 13 and 14. Each of the base sections 18 also includes a top surface 22 substantially parallel to bottom portion 12. Advantageously, the main surfaces 21 of the base sections 18 have a generally trapezoidal shape with the base of the trapezoid adjacent the bottom portion 12. Preferably, the main surfaces 21 of the base sections have a height less than the length of their base. It is preferred that the main surfaces 21 of the base sections 18 be spaced from the wall portions 13 and 14 a distance less than the length of the top edge of the main surfaces.

The base sections 18 are disposed between the buttress sections 17 as shown in the drawings. The base sections 18 are disposed along one sidewall portion 13 or 14 in positions different, that is, staggered, from the positions of the buttress and base sections 17 and 18, respectively, disposed along an opposite wall portion. This arrangement allows the tanks to be stacked without interference of the buttress and base sections of respective tanks.

The tank of the present invention may be fabricated of any suitable material such as metal, plastic and the like. Advantageously, the container is formed of a plastic material such as fiberglass. It is desirable to mold the bottom portion 12, the sidewall portions 13 and the endwall portions 14 as a single integral structure. Preferably, the buttress sections 17 and the base sections 18 also are integrally molded with the bottom and wall portions. It is especially preferred that the bottom portion 12, the wall portions 13 and 14 and the support sections 17 and 18 merge into adjacent portions along curved surfaces as shown.

The tank of the present invention typically is fabricated as a single unit with the structure being built up of layers of fiberglass fabric or roving laid on a mold and then impregnated with resin. Advantageously, the inside surface of the bottom portion 12 has a roughened surface to facilitate stock stepping out of the tank if they should accidentally get into the tank. A roughened surface may be achieved simply by distributing sand or other fine aggregate over the surface while the final coat of resin is still soft.

In the use of the tank of the invention, the tank is loaded on a truck with a standard stake or flat bed body. The dimensions of the tank advantageously are such that the width of the tank is approximately the same as the width of the truck. The length of the tank can be longer than the truck body and overhang to the rear. A number of tanks can be stacked with the outside of bottom portion 12 of each tank resting on the top surface 22 of the next lower tank. With this arrangement of the tanks, it is possible to carry a number of tanks in a standard truck body without the tanks overhanging the width of the body. Thus, it is not necessary to obtain special permits for moving the overwide load on a highway.

The above description and the accompanying drawings show that the present invention provides a novel tank which is simple in design and has features not available with previous tanks. The tank of the invention is of a configuration which enables it to be handled and transported simply and conveniently. The tank can be stacked so that a number can be carried in a single truckload. The tank fits on trucks with stake or flat bed bodies without creating overwide loads and the special permits required. Also, the tank is light in weight with good durability. Further, the tank is impervious to corrosion.

The tank of the invention can be fabricated in large sizes. The tank is strong and can accommodate large quantities of liquid. The tank is of a design which allows stock to step from the tank if they should accidentally get into it. The tank can be constructed from commercially available materials utilizing conventional tank fabricating techniques with semi-skilled labor.

It will be apparent that various modifications can be made in the particular tank described in detail above and shown in the drawings within the scope of the invention. For example, the size, dimensions and configuration of components and the tank itself can be different for specific applications. Also, the structural materials from which the tank is fabricated can be changed as desired provided the function and operation of the tank is not adversely affected. Therefore, the scope of the invention is to be limited only by the following claims.

What is claimed is:

1. A tank including a bottom portion, sidewall portions and endwall portions molded as an integral structure with a top opening, a plurality of support sections spaced about the periphery of said structure and integrally molded with said bottom and wall portions, said support sections including inward buttress sections extending from said bottom portion upwardly toward and terminating adjacent the free edges of said portions, said buttress sections forming depressions in the exterior surfaces of said bottom and wall portions, each of said buttress sections including a main surface that is spaced from said wall portion adjacent said bottom portion and converges toward said wall portion adjacent the free edge thereof, said support sections including inward base sections extending upwardly from said bottom portion a fraction of the height of said wall portion, said base sections forming depressions in the exterior surfaces of said bottom and wall portions, each of said base sections including a main surface disposed substantially parallel to and spaced from said wall portion, each of said base sections including a top surface substantially parallel to said bottom portion, said base sections being disposed between said buttress sections, said base sections being disposed along one wall portion in positions staggered from the positions of buttress and base sections disposed along an opposite wall portion.

2. A tank according to claim 1 wherein said bottom portion, said wall portions and said support sections merge into adjacent portions along curved surfaces.

3. A tank according to claim 1 including a peripheral rim portion along the free edges of said wall portions.

4. A tank according to claim 1 wherein said tank has a generally rectangular opening.

5. A tank according to claim 1 wherein said main surfaces of said buttress sections have a generally rectangular shape.

6. A tank according to claim 1 wherein said main surfaces of said buttress sections have a height more than twice their width.

7. A tank according to claim 1 wherein said main surfaces of said base sections have a generally trapezoidal shape with the base thereof adjacent said bottom portion.

8. A tank according to claim 1 wherein said main surfaces of said base sections have a height less than the length of their base.

9. A tank according to claim 5 wherein said main surfaces of said buttress sections are spaced from said wall portions at a point adjacent said bottom portion a distance less than the width of said main surfaces.

10. A tank according to claim 7 wherein said main surfaces of said base sections are spaced from said wall portions a distance less than the length of the top edge of said main surfaces.

11. A tank according to claim 1 wherein said bottom portion has a roughened inner surface.

* * * * *